UNITED STATES PATENT OFFICE 2,399,512

PRODUCTION OF HALOGENATED HYDROCARBONS

Louis Schmerling, Riverside, Ill., assignor to Universal Oil Products Company, Chicago, Ill., a corporation of Delaware No Drawing. Application July 29, 1943, Serial No. 496,568

4 Claims. (Cl. 260—658)

This invention relates to the condensation of a saturated halide and an olefin or halo-olefin to produce a higher boiling saturated halide or halogenated saturated hydrocarbon. More specifically the process is concerned with the condensation of a haloalkane or halocycloalkane and an olefinic hydrocarbon or halo-olefin in the presence of a sulfuric acid catalyst.

By the term "condensation" used in this specification and in the claims, I mean the chemical combination of a saturated halide (comprising haloalkanes and halocycloalkanes) and an olefin or halo-olefin to produce a higher boiling halogen-containing compound with a molecular weight equal to the sum of the molecular weights of said saturated halide and olefin or of said saturated halide and halo-olefin.

An object of this invention is the condensation in the presence of a sulfuric acid catalyst of a saturated organic halide and a member selected from the group consisting of olefins and halo-olefins.

Another object of this invention is the condensation in the presence of a sulfuric acid catalyst of a haloalkane or halocycloalkane and a member selected from the group consisting of olefins and halo-olefins to produce higher boiling halogenated hydrocarbons.

A further object of this invention is the production of a higher boiling monohaloalkane by the condensation of a lower boiling alkyl halide and an olefinic hydrocarbon in the presence of a sulfuric acid catalyst.

A still further object of this invention is the production of a haloalkylcycloalkane by condensation of an alkyl halide and a cyclo-olefin in the presence of a sulfuric acid catalyst.

In one specific embodiment the present invention comprises a process for condensing alkyl halides with olefinic hydrocarbons or halo-olefins in the presence of a sulfuric acid catalyst to produce higher boiling alkyl halides or dihaloalkanes.

In a further embodiment the present invention comprises a process for condensing a halocycloparaffin and an olefin or halo-olefin in the presence of a sulfuric acid catalyst to produce a higher boiling haloalkylcycloparaffin or dihalo-alkylcycloparaffin.

Saturated organic monohalides which may be reacted with olefins or halo-olefins according to the process of this invention include alkyl halides and halocycloparaffins which may also be referred to as monohaloalkanes and monohalocycloalkanes, respectively. In general, tertiary halides are preferred to primary and secondary halides. Chlorides and bromides are also generally preferred for use in condensation reactions with olefinic and halo-olefinic hydrocarbons, but alkyl and cycloalkyl fluorides and iodides may also be utilized although not necessarily under the same conditions of operation particularly when different unsaturated compounds such as olefins and halo-olefins are also involved in the production of various higher molecular weight halogen-containing compounds. Examples of chlorides which are especially useful in the process of this invention are tertiary butyl chloride, tertiary amyl chloride, 1 - chloro - 1 - methylcyclopentane, 1-chloro-1-methylcyclohexane, and 9-chlorodecahydronaphthalene.

Some alkyl halides and cycloalkylhalides are produced by addition of a hydrogen halide such as hydrogen chloride or bromide to a mono-olefinic hydrocarbon or cyclo-olefinic hydrocarbon, said addition reaction being effected generally in the presence of a catalyst such as a Friedel-Crafts type metal halide, an acid such as sulfuric acid, phosphoric acid, etc. Such an addition of a hydrogen halide to an olefin results in the production of secondary alkyl halides from non-tertiary olefins containing three or more carbon atoms per molecule and in the formation of tertiary alkyl halides from tertiary olefins such as isobutylene, trimethyl ethylene, etc. Primary alkyl halides also utilizable in the present process for producing higher boiling alkyl halides are obtainable by other means such as the addition of a hydrogen halide to ethylene, the treatment of a primary alcohol with hydrogen halide in the presence of a suitable catalyst such as zinc chloride, etc. Primary alkyl bromides may be obtained from a 1-alkene or alpha-olefin by addition of hydrogen bromide in the presence of peroxides or sunlight.

Olefinic hydrocarbons utilizable in the present process include olefins and cyclo-olefins. The olefins may be either normally gaseous or normally liquid and comprise ethylene, propylene, butylenes, and higher normally liquid olefins, the latter including various polymers of normally gaseous olefinic hydrocarbons. These aliphatic olefinic hydrocarbons which are utilizable in the present process, although not at exactly the same conditions of operation, may be obtained from any source and particularly from the products of catalytic and thermal cracking of oils, by dehydrogenation of paraffinic hydrocarbons, or by dehydrating alcohols.

Cyclo-olefinic hydrocarbons utilizable in the present process comprise cyclic hydrocarbons of the general formula $C_nH_{2n-2}$ in which $n$ represents an integer which is at least 3 and preferably 5 or 6. Cyclopentene, alkylcyclopentene, cyclohexene, and alkylcyclohexenes are the cyclo-olefins which I prefer to react with alkyl halides to produce alkyl-cyclopentyl and alkylcyclohexyl-halides including monoalkyl and polyalkylcycloalkyl halides. Thus, a cyclo-olefin and an alkyl halide condense to form an alkylcycloalkyl halide while a monoalkylcyclo-olefin and an alkyl halide react to form a dialkylcycloalkyl halide. Cyclopropene, cyclobutene, and alkylcyclobutenes are generally more difficult to obtain than the cyclo-olefins containing rings of 5 or 6 carbon atoms, and accordingly are used less frequently in the present process.

Certain types of terpenic hydrocarbons, particularly those with one double bond per molecule, may be condensed with alkyl halides to form higher molecular weight compounds which may be considered as alkylcycloalkyl halides.

Halo-olefins which are condensed with saturated halides as herein set forth contain at least one halogen atom and one double bond per molecule, and comprise halo-ethenes, -propenes, -butenes, -pentenes, and higher halo-alkenes. Vinyl chloride, allyl chloride, allyl bromide, propenyl chloride, and isopropenyl chloride are representative of suitable halo-olefins containing 1 halogen atom and 1 double bond per molecule and utilizable in the present process. The term "halo-olefins" is used herein in reference to the above-mentioned unsaturated halogen compounds as well as to other unsaturated compounds such as halocyclo-olefins containing one halogen atom and one double bond per molecule. Compounds containing one double bond and more than one halogen atom per molecule, and other compounds containing more than one double bond and one or more chlorine or bromine atoms per molecule, may also be used in the process of the present invention, although not necessarily under the same conditions of operation.

Halo-olefins may be formed in any suitable manner such as by the action of a halogen upon an olefin at a temperature at which substitution occurs and at a temperature substantially in excess of that at which the principal reaction is addition of a halogen to the olefinic double bond. They may also be prepared by the addition of a halogen to an olefinic double bond to form a dihaloalkane from which one molecule of hydrogen halide may be removed by any of several well known methods to produce a halo-olefin. Furthermore halo-olefins may be prepared by addition of hydrogen halide to acetylenic hydrocarbons.

The concentration of the sulfuric acid which is used as catalyst will depend in general on the particular saturated halide and olefinic hydrocarbon or halo-olefin charged to the condensation reaction. In general, the sulfuric acid concentration will be from about 85% to about 100% H₂SO₄, but I prefer to employ sulfuric acid of about 96% H₂SO₄ concentration particularly when charging olefinic hydrocarbons containing at least four carbon atoms per molecule. However, when propylene or a halo-olefin containing 3 carbon atoms per molecule is used as a reactant, it is generally preferable to use as catalyst a sulfuric acid solution containing from about 96 to about 100% H₂SO₄.

The process for condensing saturated halides with olefins or cyclo-olefins is apparently somewhat analogous to the addition of a hydrogen halide to either of these unsaturated hydrocarbons. That is, the alkyl halide apparently adds to the double bond of the unsaturated hydrocarbon producing another alkyl halide of higher molecular weight. For example, the condensation of tertiary butyl chloride with ethylene produces 4-chloro-2,2-dimethylbutane, which is a chloroneohexane, as illustrated by the following equation:

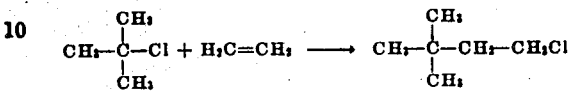

Tertiary butyl chloride undergoes similar condensations with propylene and with n-butylene producing chloroheptane and chloro-octane, respectively. Similarly bromoheptane may be obtained by the reaction of tertiary butyl bromide with propylene. Under some conditions the combination of an alkyl halide with an olefin may be so controlled as to give other higher boiling alkyl halides containing all of the components of both the original olefin and lower boiling alkyl halide charged to the process.

In reactions between saturated halides and halo-olefins it appears that a saturated halide adds to the double bond of a halo-olefin to produce a dihaloalkane with a molecular weight equal to the sum of the molecular weights of the two reactants. For example, the condensation of tertiary butyl chloride with vinyl chloride produces 1,1-dichloro-3,3-dimethylbutane, which is a dichloroneohexane. This reaction is illustrated by the following equation:

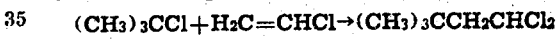

The dichlorohexane indicated in the preceding equation may be converted into neohexane, tertiary butyl acetaldehyde, chlorohexene, or other desirable compounds. The process of this invention thus teaches a simple method for preparing compounds containing a quaternary carbon atom as well as of homologs of vinyl chloride.

The condensation of a saturated halide and a member selected from the group consisting of olefins and halo-olefins is carried out by contacting the reactants in the presence of sulfuric acid at a temperature of from about $-40°$ to about $100°$ C. but preferably at a temperature of from about $-10°$ to about $50°$ C. generally while maintaining a pressure sufficient to keep in liquid state a substantial proportion of the reactants. The reactions of different saturated halides with different olefinic and halo-olefinic hydrocarbons are not necessarily carried out with equal ease or at the same conditions of operation. Sometimes when the operating temperature is higher than the preferred temperature, secondary reactions such as dehydrohalogenation and polymerization become substantial. Tertiary halides are more reactive with olefins and halo-olefins than are secondary halides, and in turn the secondary halides are more reactive than primary halides. Accordingly, primary, secondary, and tertiary alkyl halides and different halocycloalkanes are generally not utilizable under the same conditions of operation.

The reaction of a saturated halide with an olefin or halo-olefin may be carried out in the presence of sulfuric acid used in either batch or continuous types of operation. In batch type operation, desired proportions of saturated halide (such as alkyl halide or halocycloalkane) and an olefin or halo-olefin are introduced to a suitable reactor together with a sulfuric acid catalyst, and the resultant commingled materials are contacted at a reaction temperature until a substantial proportion of the reactants are converted into the desired higher molecular weight halogenated hydrocarbon. The reaction mixture after separation from the catalyst is fractionated to separate the unconverted saturated halide and olefin or halo-olefin from the higher boiling halogenated hydrocarbon, and the recovered reactants and catalyst may then be used in another run to produce an additional quantity of the desired halogenated hydrocarbon.

Continuous operations may be carried out by conducting a mixture of a saturated halide and an olefin or halo-olefin through a reactor of suitable design in the presence of sulfuric acid. In this type of treatment, the operating conditions may be adjusted suitably, and may differ somewhat from those employed in batch type operation.

In some cases it may be advisable to commingle the charged alkyl halide or halocycloalkane and olefin or halo-olefin with a substantially inert solvent such as a paraffinic hydrocarbon, for example, normal pentane, and then to effect condensation in the presence of this added solvent and of the sulfuric acid catalyst. Obviously the solvent chosen should be one which does not undergo undesirable reactions with the other components of the reaction mixture under the operating conditions of the reaction.

Different higher boiling halogenated hydrocarbons produced by the present process may be used for various purposes. Some of them may be converted into hydrocarbons of high antiknock value, others may be used as solvents or employed as intermediate compounds in organic syntheses.

The following examples are given to illustrate the character of results obtained by the use of the present process, although the data presented are not introduced with the intention of unduly restricting the generally broad scope of the invention.

Example I 3.6 molecular proportions of tertiary butyl chloride and 3.0 molecular proportions of propylene when reacted at 10° C. for 2 hours in the presence of 1 molecular proportion of 100% sulfuric acid gave 12% of the theoretical yield of a chloroheptane boiling from 140° to 143° C., a 6% yield of chloroheptane boiling at 128°-132° C., and in addition a 20% yield of isopropyl chloride formed by addition to propylene of hydrogen chloride resulting from decomposition of some of the tertiary butyl chloride into isobutylene and hydrogen chloride.

Example II 1 molecular proportion of butylene-2 was added at 10° C. during 2 hours to a well stirred mixture of 2 molecular proportions of tertiary butyl chloride and 1 molecular proportion of 96% sulfuric acid. From the resultant reaction product an 18% yield was obtained of a chloro-octane boiling at 154°-160° C. and a 50% yield of secondary butyl chloride. The chloro-octane boiling at 154°-160° C. was probably 4-chloro-2,2,3-trimethylpentane.

The foregoing specification and examples illustrate the novelty and utility of the present invention, although neither section is introduced with the intention of unduly limiting its generally broad scope.

I claim as my invention:

1. A process for the production of monohaloalkanes which comprises reacting a lower boiling tertiary monohaloalkane with a mono-olefin in the presence of a sulfuric acid catalyst at a temperature of from about −10° C. to about 50° C. and a pressure sufficient to maintain the reactants in substantially liquid state and recovering from the resultant products a higher boiling monohaloalkane having a molecular weight equal to the sum of the molecular weights of said lower boiling tertiary monohaloalkane and said mono-olefin.

2. A process for the production of monochloroalkanes which comprises reacting tertiary butyl chloride with a mono-olefin in the presence of a sulfuric acid catalyst at a temperature of 10° C. and a pressure sufficient to maintain the reactants in substantially liquid state and recovering from the resultant products a higher boiling monochloroalkane having a molecular weight equal to the sum of the molecular weights of said tertiary butyl chloride and said mono-olefin.

3. A process for the production of monochloroalkanes which comprises reacting tertiary butyl chloride with propylene in the presence of a sulfuric acid catalyst at a temperature of 10° C. and a pressure sufficient to maintain the reactants in substantially liquid state and recovering from the resultant products a higher boiling monochloroalkane having a molecular weight equal to the sum of the molecular weights of said tertiary butyl chloride and said propylene.

4. A process for the production of monochloroalkanes which comprises reacting tertiary butyl chloride with butylene in the presence of a sulfuric acid catalyst at a temperature of 10° C. and a pressure sufficient to maintain the reactants in substantially liquid state and recovering from the resultant products a higher boiling monochloroalkane having a molecular weight equal to the sum of the molecular weights of said tertiary butyl chloride and said butylene.

LOUIS SCHMERLING.